(12) United States Patent
Nishikawa et al.

(10) Patent No.: US 10,792,844 B2
(45) Date of Patent: Oct. 6, 2020

(54) AIRFLOW CONTROL APPARATUS AND METHOD FOR MANUFACTURING STRETCHED FILM

(71) Applicant: TORAY INDUSTRIES, INC., Tokyo (JP)

(72) Inventors: Toru Nishikawa, Otsu (JP); Ryuta Abe, Otsu (JP)

(73) Assignee: Toray Industries, Inc., Tokyo (JP)

( * ) Notice: Subject to any disclaimer, the term of this patent is extended or adjusted under 35 U.S.C. 154(b) by 161 days.

(21) Appl. No.: 15/773,243

(22) PCT Filed: Dec. 14, 2016

(86) PCT No.: PCT/JP2016/087208
§ 371 (c)(1),
(2) Date: May 3, 2018

(87) PCT Pub. No.: WO2017/115654
PCT Pub. Date: Jul. 6, 2017

(65) Prior Publication Data
US 2018/0311866 A1    Nov. 1, 2018

(30) Foreign Application Priority Data

Dec. 28, 2015  (JP) .................................. 2015-256029

(51) Int. Cl.
*B29C 35/04*  (2006.01)
*B29C 55/12*  (2006.01)
(Continued)

(52) U.S. Cl.
CPC ............ *B29C 35/045* (2013.01); *B29C 55/12* (2013.01); *B29C 55/20* (2013.01);
(Continued)

(58) Field of Classification Search
None
See application file for complete search history.

(56) References Cited

U.S. PATENT DOCUMENTS 9,522,488 B2    12/2016   Lee et al.
2010/0059036 A1  3/2010   Inoue et al.
2014/0013612 A1  1/2014   Lee et al.

FOREIGN PATENT DOCUMENTS

CN    103442879 A    12/2013
EP    2123427 A1    11/2009
(Continued)

OTHER PUBLICATIONS

Brandrup, J. Immergut, Edmund H. Grulke, Eric A. Abe, Akihiro Bloch, Daniel R.. (1999; 2005). Polymer Handbook (4th Edition). Glass Transition Temperatures of Polymers. John Wiley & Sons. ("Polymer Handbook".) (Year: 2005).*

(Continued)

*Primary Examiner* — Xiao S Zhao
*Assistant Examiner* — John J Derusso
(74) *Attorney, Agent, or Firm* — RatnerPrestia

(57) ABSTRACT

An airflow control apparatus for a tenter oven including an entrance into which a film is conveyed and an exit from which the film is taken out, the airflow control apparatus having a box-shaped body installed adjacent to at least one or both of an upstream side in a film running direction of the entrance and a downstream side in the film running direction of the exit, includes: at least one pair of air blowing nozzles configured to blow air toward the film; at least one pair of upstream-side exhaust mechanisms configured to discharge air in the box-shaped body, and located on the upstream side of the air blowing nozzles in the film running direction; and at least one pair of downstream-side exhaust mechanisms configured to discharge the air in the box-shaped body, and located on the downstream side of the air blowing nozzles in the film running direction.

9 Claims, 11 Drawing Sheets

(51) Int. Cl.
  *B29L 7/00* (2006.01)
  *B29C 55/20* (2006.01)
  *B29K 101/12* (2006.01)

(52) U.S. Cl.
  CPC .... *B29C 2035/046* (2013.01); *B29K 2101/12* (2013.01); *B29L 2007/008* (2013.01)

(56) References Cited

FOREIGN PATENT DOCUMENTS

| | | | |
|---|---|---|---|
| EP | 2692508 | A1 | 2/2014 |
| GB | 2175246 | A | 11/1986 |
| JP | 61263727 | A | 11/1986 |
| JP | 2001162635 | A * | 6/2001 |
| JP | 2003039543 | A | 2/2003 |
| JP | 2005008407 | A | 1/2005 |
| JP | 2009269268 | A | 11/2009 |
| JP | 2014208456 | A | 11/2014 |
| JP | 2015042388 | A | 3/2015 |
| WO | 2008114586 | A1 | 9/2008 |
| WO | 2012133152 | A1 | 10/2012 |

OTHER PUBLICATIONS

Translation of JP-2001162635-A (Year: 2001).*
Extended European Search Report for European Application No. 16 881 633.8, dated Jul. 11, 2019, 7 pages.
Chinese Office Action for Chinese Application No. 201680072648.7, dated Oct. 8, 2019, with translation, 12 pages.
International Search Report and Written Opinion for International Application No. PCT/JP2016/087208, dated Feb. 14, 2017, 6 pages.

* cited by examiner

AIRFLOW CONTROL APPARATUS AND METHOD FOR MANUFACTURING STRETCHED FILM

CROSS REFERENCE TO RELATED APPLICATIONS

This is the U.S. National Phase application of PCT/JP2016/087208, filed Dec. 14, 2016, which claims priority to Japanese Patent Application No. 2015-256029, filed Dec. 28, 2015, the disclosures of these applications being incorporated herein by reference in their entireties for all purposes.

TECHNICAL FIELD OF THE INVENTION

The present invention relates to an airflow control apparatus installed at an entrance and/or an exit of a tenter oven suitable for manufacturing a stretched film made of thermoplastic resin, and a method for manufacturing a stretched film made of thermoplastic resin using the airflow control apparatus.

BACKGROUND OF THE INVENTION

As methods for manufacturing a stretched film made of thermoplastic resin, a sequential biaxial stretching method and a simultaneous biaxial stretching method have been known. In the sequential biaxial stretching method, by stretching an unstretched film made of thermoplastic resin in the longitudinal direction thereof, a uniaxially stretched film is obtained and, thereafter, the uniaxially stretched film is introduced into a tenter oven and is stretched therein in the width direction thereof. In the simultaneous biaxial stretching method, an unstretched film made of thermoplastic resin is introduced into a tenter oven and is simultaneously stretched therein in the longitudinal direction and the width direction thereof.

The stretched films made of thermoplastic resin are widely used for various industrial material uses including package uses. Among them, the sequentially biaxial stretched films of polyester, polyolefin, or polyamide resin are widely used for the uses, for which the unstretched films cannot withstand, due to their excellent mechanical characteristics, thermal characteristics, electrical characteristics, and the like, and the amount of demand is also increasing.

As a problem with a tenter oven for manufacturing the stretched films made of thermoplastic resin, because the circulation of air is not completed in individual chambers constituting the tenter oven, there are phenomena in which the air of a different set temperature flows into an adjacent chamber, the outside air from the outside of the chamber of the tenter oven flows into the oven, and the air in the chamber of the tenter oven blows to the outside of the oven. All of these phenomena are phenomena in which air flows in the running direction of the film, and such a flow of air is referred to as a machine direction (MD) flow. The MD flow occurs due to an accompanying airflow in running the film, imbalance between the amount of heated air supplied into the tenter oven and the amount of exhaust discharged from the inside of the tenter oven, or the like.

When the MD flow occurs, as the air of a different temperature flowing in from the outside of the chamber, while flowing near the film, is mixed with heated air blown from an air blowing nozzle in the chamber, unevenness of efficiency in heating the film occurs, and significant temperature unevenness in the film occurs. In the tenter oven, conducted is at least one process of a pre-heating process of raising the temperature of the film to a desired temperature, a stretching process of expanding the width of the film to a desired width, a heat fixation process of heat-treating the film at a desired temperature, and a cooling process of cooling down the film to a desired temperature. When the temperature unevenness occurs in any of these processes, it causes unevenness of film thickness and unevenness of characteristics also, and the quality of the product deteriorates. In addition to the deterioration of the product quality, the breakage of film in the tenter oven may occur and the productivity may deteriorate.

Due to the MD flow for which the outside air from the outside of the chamber of the tenter oven flows into the oven, the following influence occurs. When circulating air is mixed with the air of a lower temperature than the set temperature of the circulating air in the chamber from the outside of the tenter oven, the consumption energy of a heat exchanger necessary for reheating the circulating air to the set temperature of the chamber increases. Furthermore, due to the MD flow, the straightness of the air blown from an air blowing opening of the air blowing nozzle toward the film surface is lost, the blown air is easy to flow in the running direction of the film, and the original heating performance of the air blowing nozzle is no longer expected. In this state, in order to maintain the heating performance, it needs to increase the air volume of blown air or to raise the temperature, and as a result, the energy consumption of the heat exchanger increases.

Furthermore, due to the MD flow for which the air in the chamber of the tenter oven blows to the outside of the oven, the following influence occurs. When the air heated in the chamber of the tenter oven blows to the outside of the chamber of the tenter oven, because the temperature, of a working area surrounding the tenter oven is raised, the working environment surrounding the tenter oven is deteriorated and the proper operation of the tenter oven may no longer be performed. Moreover, the sublimate from the film may be mixed in with the air blown to the outside of the chamber of the tenter oven, and because it may cause foreign matter defects by depositing and adhering onto the film surface outside the chamber of the tenter oven, may deteriorate the productivity.

In order to prevent, due to the MD flow, the air from flowing in from the outside of the chamber of the tenter oven and/or prevent the air in the chamber from blowing to the outside of the chamber of the tenter oven, it is conceivable to adjust the balance between the amount of supply air and the amount of exhaust air in the tenter oven. However, because changing the amount of air of the supply air and/or the exhaust air of a part of the tenter oven affects the air balance of the entire tenter oven, adjustment parameters to optimize the balance between the supply air and the exhaust air increase. Accordingly, after changing production conditions due to the change of production models or the like, it may take time for adjusting the amount of supply air and the amount of exhaust air of the tenter oven, which may deteriorate the productivity.

Patent Literature 1 discloses a method of preventing the deposition of sublimate that arises in a heat treatment zone of a film. Specifically, it is a method in which heated air is blown to the downstream side of the film and the air is exhausted from an exhaust area provided on the upstream side thereof, in an arbitrarily partitioned zone in a transverse stretching zone and/or in a heat treatment zone.

Patent Literature 2 discloses a method of stably running a sheet, by installing an air blowing nozzle that includes a flat portion and an inclined portion connected thereto on the upper side or the lower side with respect to the running surface of the sheet and flowing the air that is parallel to the sheet surface. With this method, the gap between the sheet and the air blowing nozzle can be narrowed, and it has an effect in that the transfer of heat at the gateway of the heat treatment chamber is suppressed.

Patent Literature 3 discloses a configuration of a tenter oven that is capable of suppressing the occurrence of the MD flow, by focusing on the distance from the air blowing surface of the air blowing nozzle to the passing surface of the film.

Patent Literature 4 discloses a configuration that prevents the air of a high temperature from flowing out from a heating area chamber by providing a plate-like buffer zone of the upper and lower surfaces at the conveyance gateway of a stretching machine.

Patent Literature 5 discloses a method of maintaining the quantity of particles in a working environment outside a film drying device to below a certain level by sucking a vaporized solvent leaking out of the film drying device.

CITATION LIST

Patent Literature

Patent Literature 1: Japanese Laid-open Patent Publication No. S61-263727
Patent Literature 2: Japanese Laid-open Patent Publication No. 2005-008407
Patent Literature 3: WO2012/133152
Patent Literature 4: Japanese Laid-open Patent Publication No. 2009-269268
Patent Literature 5: Japanese Laid-open Patent Publication No. 2015-042388

SUMMARY OF THE INVENTION

However, in the method disclosed in Patent Literature 1, it is not possible to prevent the MD flow for which the air flows into the oven from the outside of the chamber of the tenter oven. Thus, when the temperature of the MD flow is lower than the set temperature of the circulating air in the chamber, the MD flow that flowed near the film is mixed with heated air blown from the air blowing nozzle in the chamber, thereby causing significant temperature unevenness to the film.

In the method disclosed in Patent Literature 2, because the air flows parallel to the sheet surface, the MD flow rather increases. Thus, the original heating performance of the air blowing nozzle installed in the chamber of the tenter oven is no longer expected.

In the configuration disclosed in Patent Literature 3, the air blowing nozzle is provided inside the tenter oven. Thus, in order to suppress the inflow and blowing of air that passes through the gateway of the tenter oven, it needs to adjust the balance between the amount of supply air and the amount of exhaust air in the tenter oven. However, as in the foregoing, because changing the amount of air of the supply air and/or the exhaust air of a part of the tenter oven affects the air balance of the entire tenter oven, parameters to optimize the balance between the supply air and the exhaust air will increase. As a result, after changing production conditions such as the change of models, the productivity may be deteriorated as it takes time for adjusting the amount of supply air of the tenter oven and the amount of exhaust air.

In the configuration disclosed in Patent Literature 4, in order to prevent the outflow of high-temperature air, it needs to sufficiently make the opening area of the plate-shaped buffer zone of the upper and lower surfaces small and to increase the fluid resistance. Thus, there is a possibility that the plate-shaped buffer zone of the upper and lower surfaces comes into contact with the film, scratches are caused on the film surface, and the productivity is deteriorated.

The method disclosed in Patent Literature 5 is a technique concerning the drying device in the film manufacturing process and is different from the air control apparatus provided in the tenter oven of the present invention in terms of problems to be solved, technical ideas, and effects of the invention. Even if the method disclosed in Patent Literature 5 is applied to the tenter oven, it is not possible to prevent the MD flow for which the air flows into the oven from the outside of the chamber of the tenter oven.

In order to solve the above-described various problems, the present invention provides an airflow control apparatus that suppresses the inflow of air to the tenter oven from the outside of the chamber and suppresses the outflow of air to the outside of the chamber from the tenter oven.

An airflow control apparatus according to the present invention that solves the above-described problem is an airflow control apparatus for a tenter oven including an entrance into which a film is conveyed and an exit from which the film is taken out, the airflow control apparatus having a box-shaped body installed adjacent to at least one or both of an upstream side in a film running direction of the entrance and a downstream side in the film running direction of the exit, and includes therein: at least one pair of air blowing nozzles that are air blowing nozzles configured to blow air toward the film, the air blowing nozzles facing each other across a film passing surface; at least one pair of upstream-side exhaust mechanisms that are exhaust mechanisms configured to discharge air in the box-shaped body, the upstream-side exhaust mechanisms being located on the upstream side of the pair of air blowing nozzles in the film running direction, and facing each other across the film passing surface; and at least one pair of downstream-side exhaust mechanisms that are exhaust mechanisms configured to discharge, the air in the box-shaped body, the downstream-side exhaust mechanisms being located on the downstream side of the pair of air blowing nozzles in the film running direction, and facing each other across the film passing surface.

It is preferable that the airflow control apparatus of the present invention include the following respective configurations.

A plurality of pairs of the air blowing nozzles are provided.

A plurality of pairs of at least one or both of the upstream-side exhaust mechanisms and the downstream-side exhaust mechanisms are provided.

A shape of an air blowing opening of each of the air blowing nozzles is in a slit shape extending parallel to a film width direction, or the air blowing opening includes a plurality of holes lined in the film width direction, and an angle that is formed by an air blowing direction of the air blowing opening and the film passing surface is substantially a right angle.

A distance L between the air blowing opening and the film passing surface and a length B in the film running direction of a slit of the air blowing opening satisfy $L/B \leq 11$, or the distance L between the air blowing opening and the film passing surface and a diameter R of the hole of the air blowing opening satisfy $L/R \leq 11$.

The air blowing nozzles are formed by a plurality of housings in a fitting configuration in a film width direction and include a mechanism that expands and contracts in the film width direction.

A method for manufacturing a stretched film according to the present invention that solves the above-described problem includes: passing a film to a tenter oven and to the airflow control apparatus according to any one of claims 1 to 6 installed adjacent to at least one or both of the upstream side in the film conveying direction of the entrance of the tenter oven and the downstream side in the film conveying direction of the exit of the tenter oven; discharging air in the airflow control apparatus by the upstream-side exhaust mechanism and the downstream-side exhaust mechanism while air blowing air toward a running film from the air blowing nozzles, in the airflow control apparatus; and stretching the running film while heating the running film, in the tenter oven.

It is preferable that the method for manufacturing a stretched film of the present invention perform the following methods.

The airflow control apparatus is installed adjacent to the upstream side in the film conveying direction of the entrance of the tenter oven, and temperature of air blown from the air blowing nozzles is not lower than temperature of air outside of a tenter oven chamber at the entrance of the tenter oven but not higher than a glass transition temperature of the film.

The airflow control apparatus is installed adjacent to the downstream side in the film conveying direction of the exit of the tenter oven, and temperature of air blown from the air blowing nozzles is not lower than temperature of air outside of a tenter oven chamber at the exit of the tenter oven but not higher than a glass transition temperature.

According to the airflow control apparatus of the present invention, it is possible to suppress the inflow of air to the tenter oven from the outside of the chamber and suppress the outflow of air to the outside of the chamber from the tenter oven. Due to this effect, it is expected that various problems attributable to the MD flow are resolved as follows.

(a) By suppressing the inflow of air of a temperature different from the set temperature of the circulating air in the chamber from the outside of the chamber of the tenter oven, it is possible to reduce temperature unevenness of the film and to manufacture a stretched film made of thermoplastic resin for which the characteristics and thickness in the width direction of the film are uniform.

(b) It is possible to reduce the energy consumption needed to heat the film to a certain temperature and to maintain the temperature.

(c) It is possible to prevent the air heated in the chamber of the tenter oven from blowing to the outside of the chamber of the tenter oven, to prevent the temperature of the working area surrounding the tenter oven from rising, and to prevent the working environment surrounding the tenter oven from deteriorating.

(d) It is possible to prevent the sublimate from the film from flowing out of the chamber of the tenter oven, and to prevent the productivity from deteriorating, as the sublimate deposits and adheres onto the film surface outside the chamber of the tenter oven and causes foreign matter defects.

(e) Because the MD flow can be suppressed, it is possible to reduce the time for adjusting the balance between the amount of supply air and the amount of exhaust air in the inside of the oven and to prevent the productivity from deteriorating.

DETAILED DESCRIPTION OF CERTAIN EMBODIMENTS OF THE INVENTION

With reference to the accompanying drawings, several exemplary embodiments of a tenter oven of the present invention will be described.

Figure 1:
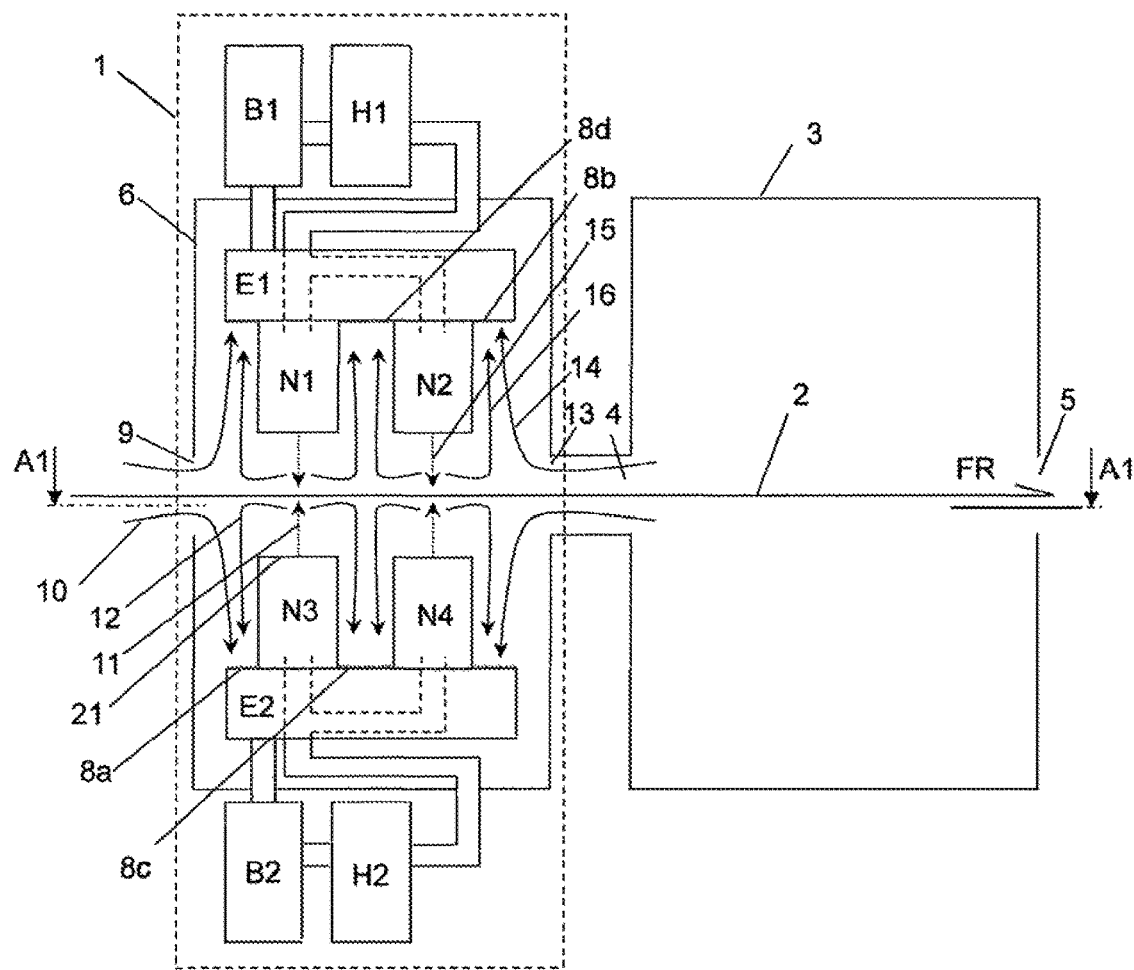
FIG. 1 is a schematic cross-sectional view in a film running direction in one form of an airflow control apparatus of the present invention.
Figure 2:
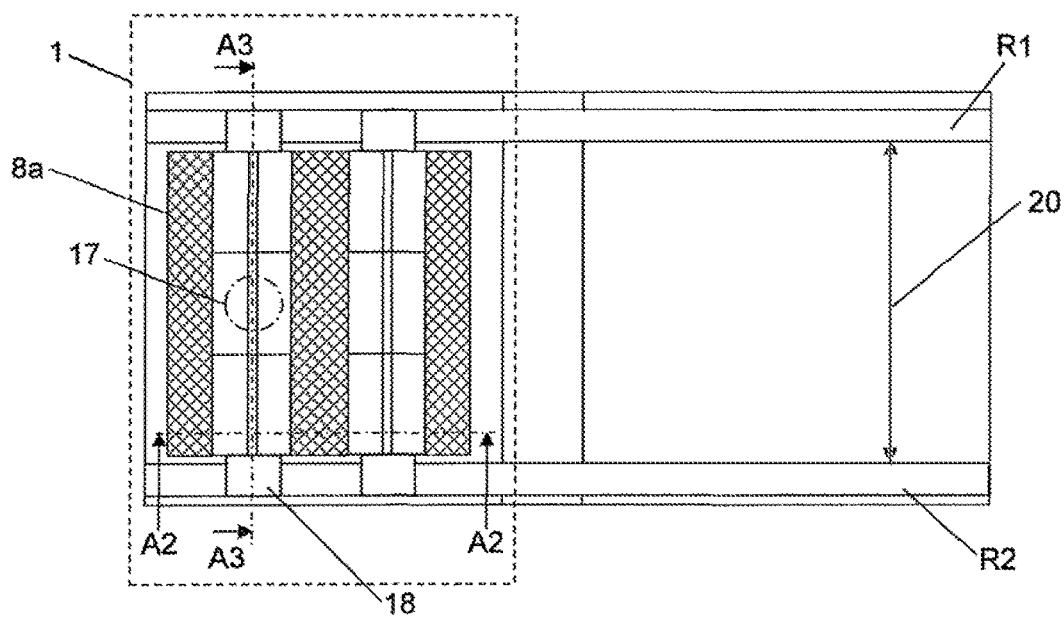
FIG. 2 is a schematic cross-sectional view in the direction of arrows A1-A1 indicated in FIG. 1.

FIGS. 1 and 2 are referred to. FIG. 1 is a schematic cross-sectional view in a film running direction in one form of an airflow control apparatus of the present invention. FIG. 2 is a schematic cross-sectional view in the direction of arrows A1-A1 indicated in FIG. 1. In FIG. 1, an airflow control apparatus 1 is installed adjacent to an entrance 4 of a tenter oven 3 on the upstream side in the film running direction. Inside the airflow control apparatus 1, two upper-side air blowing nozzles N1 and N2 are provided at intervals in the film running direction. Air blowing surfaces 21 of the respective air blowing nozzles face a film passing surface 2 at intervals with respect to the film passing surface 2.

On also the lower surface side of the film passing surface 2, two lower-side air blowing nozzles N3 and N4 are provided at intervals in the film running direction. The air blowing surfaces 21 of the respective air blowing nozzles face the film passing surface 2 at intervals with respect to the film passing surface 2.

Normally, the air blowing nozzle is formed of a housing, includes therein a flow path of heated air that is supplied from a supply source, and on one surface thereof, includes the air blowing surface 21 along the longitudinal direction of the housing (width direction of the running film).

On the air blowing surfaces 21 of the air blowing nozzles N1, N2, N3, and N4, air blowing openings 17 are provided that blow the heated air. Each air blowing opening 17 is formed by a slit. The air blowing nozzles N1, N2, N3, and N4 are supplied with hot air for which the air is supplied by blowers B1 and B2 and is heated to a set temperature by heat exchangers H1 and H2. The air blowing opening 17 may be not in a slit shape but in a shape in which a plurality of holes are lined in the film width direction.

The flow of air blown from the air blowing nozzles N1, N2, N3, and N4 will be explained with the air blowing nozzle N3 as a representative. The supplied hot air is blown, as with an air blowing direction 11, from the air blowing opening 17 toward the film that is running on the film passing surface 2. The blowing air is blown uniformly extending over a nozzle width direction from the air blowing opening 17 and forms an air curtain. The air blown toward the film collides with the film, changes the direction of flow to the upstream side and the downstream side of a film conveying direction, turns into return air 12, and is sucked in an exhaust mechanism 8a and an exhaust mechanism 8c. The air blown from the air blowing nozzles N1, N2, and N4 also is sucked from the exhaust mechanisms in the same flowing manner.

When air 10 flowing in from outside the apparatus through the lower side of the film surface together with the accompanying flow that arises in the film conveying direction flows into a box-shaped body of the airflow control apparatus through an entrance 9 of the airflow control apparatus, the air 10 is blocked by the air curtain formed by the air blown from the air blowing opening 17 of the air blowing nozzle N3, changes the direction of flow, and is sucked in the exhaust mechanism 8a together with the return air 12. In this way, by sucking the air 10 flowing in from the outside of the apparatus into the exhaust mechanism 8a, it is possible to prevent the air 10 flowing in from the outside of the apparatus from flowing into the tenter oven 3 and to prevent the temperature unevenness from occurring in the tenter oven. The same applies to the air that passes through the upper side of the film surface from the outside of the apparatus and flows into the box-shaped body of the airflow control apparatus from the entrance 9.

When air 14 flowing in from the tenter oven flows into the box-shaped body of the airflow control apparatus through an exit 13 of the airflow control apparatus on the upper side of the film surface, the air 14 is blocked by the air curtain formed by the air blown from the air blowing opening 17 of the air blowing nozzle N2, changes the direction of flow, and is sucked in an exhaust mechanism 8b together with return air 16. In this way, by sucking the air 14 flowing in from the tenter oven into the exhaust mechanism 8b, it is possible to prevent the air heated in the chamber of the tenter oven from blowing to the outside of the tenter oven, prevent the temperature of the working area surrounding the tenter oven from rising, and prevent the working environment surrounding the tenter oven from deteriorating. Moreover, it is possible to prevent the productivity from deteriorating as foreign matter defects for which the sublimate from the film deposits and adheres on the film surface, on the outside of the chamber of the tenter oven. The same applies to the airflow that passes through the lower side of the film surface from the tenter oven and flows into the box-shaped body of the airflow control apparatus from the exit 13.

As in the foregoing, the air blowing nozzles N1 and N2 are arranged on the upper surface side of the film passing surface 2 such that the respective air blowing surfaces 21 face the film passing surface 2, and the air blowing nozzles N3 and N4 are arranged on the lower surface side of the film passing surface 2 such that the respective air blowing surfaces 21 face the film passing surface 2. The air blowing nozzles provided on the upper side and the lower side of the film passing surface 2 are arranged such that the air blowing surfaces 21 of the respective air blowing nozzles face each other via the film passing surface 2. Specifically, the air blowing nozzles N1 and N3 are arranged so as to face each other, and the air blowing nozzles N2 and N4 are arranged so as to face each other.

If the air blowing nozzle is provided only on the upper surface side or the lower surface side of the film passing surface 2, the MD flow is easy to flow on the side that is not provided with the air blowing nozzle, and the airflow separation effect of the air blowing nozzle is reduced.

A thermoplastic resin film is, different from materials such as cloth, difficult to allow the air to penetrate through between the upper surface and the lower surface. Thus, when the air is blown only from the upper surface side or the lower surface side of the film passing surface 2, the wind pressure of the blowing air blows up the film and the fluttering of the film increases.

In order to prevent the fluttering of the film, after providing the air blowing nozzles on the upper surface side and the lower surface side of the film passing surface 2 and arranging the air blowing surfaces 21 of the respective air blowing nozzles to face the film passing surface 2, the air blowing surface 21 of the air blowing nozzle on the upper surface side and the air blowing surface 21 of the air blowing nozzle on the lower surface side are made to face each other via the film passing surface 2. Because an effect of pressing the same position of the film from the upper surface side and the lower surface side arises by the fact that the air blowing surfaces 21 face each other, it is possible to prevent the film from fluttering.

The fact that the air blowing surfaces face each other means a state that, in the projection plane when the air blowing surface of the air blowing nozzle on the upper surface side is projected on the film passing surface 2 and in the projection plane when the air blowing surface of the air blowing nozzle on the lower surface side is projected on the film passing surface 2, at least a part of both projection planes overlaps. It is more preferable that both projection planes be in a state of overlapping completely.

The following explains this state with n sets as the number of air blowing nozzles of a pair. The n pieces of air blowing nozzles are provided on the upper surface side of the film passing surface 2, the n pieces of air blowing nozzles are also provided on the lower surface side of the film passing surface 2, the air blowing surfaces of the respective air blowing nozzles face the film passing surface 2, and the air blowing surfaces of the air blowing nozzles on the upper surface side and the air blowing surfaces of the air blowing nozzles on the lower surface side face each other.

The n sets that is the number of air blowing nozzles of a pair are effective even when the value of n is one, but the effect is further increased when there are a plurality of sets. As long as the value of n is an integer of 1 or more, the upper limit thereof is not particularly limited, but in general, the value of n only needs to be selected from a range of 300 or less.

The air blown from the air blowing nozzles to the film passing surface 2 collides with the film, changes the direction of flow, and turns into return air. In order to maintain the balance, to form the desirable return air, and to effectively suck and exhaust; at least one set of upstream exhaust mechanisms of a pair that is located on the upstream side in the film running direction than a pair of air blowing nozzles and that face each other across the film passing surface 2 is provided; and at least one set of downstream exhaust mechanisms of a pair that is located on the downstream side in the film running direction than a pair of air blowing nozzles and that face each other across the film passing surface 2 is provided.

The exhaust mechanism that is located between the two adjacent air blowing nozzles juxtaposed in the film running direction is the downstream side exhaust mechanism for the air blowing nozzle on the upstream side of the film running direction and is the upstream side exhaust mechanism for the air blowing nozzle on the downstream side of the film running direction. Specifically, with reference to FIG. 1, the exhaust mechanism 8c is the downstream exhaust mechanism for the air blowing nozzle N3 and is the upstream side exhaust, mechanism for the air blowing nozzle N4. An exhaust mechanism 8d is the downstream exhaust mechanism for the air blowing nozzle N1 and is the upstream side exhaust mechanism for the air blowing nozzle N2.

The fact that the upstream exhaust mechanisms and/or the downstream exhaust mechanisms face each other means a state that, in the projection plane when the exhaust mechanism on the upper surface side is projected on the film passing surface 2 and in the projection plane when the exhaust mechanism on the lower surface side is projected on the film passing surface 2, at least a part of both projection planes overlaps. It is more preferable that both projection planes be in a state of overlapping completely.

The following explains this state with n+1 sets as the number of exhaust mechanisms of a pair. The n+1 pieces of exhaust mechanisms are provided on the upper surface side of the film passing surface 2, the n+1 pieces of exhaust mechanisms are also provided on the lower surface side of the film passing surface 2, each exhaust mechanism faces the film passing surface 2, and the exhaust mechanism on the upper surface side and the exhaust mechanism on the lower surface side face each other.

The n+1 sets that is the number of exhaust mechanisms of a pair are effective even when the value of n is one, but the effect is further increased when there are a plurality of sets. As long as the value of n is an integer of 1 or more, the upper limit thereof is not particularly limited, but in general, the value of n only needs to be selected from a range of 300 or less.

Figure 3:
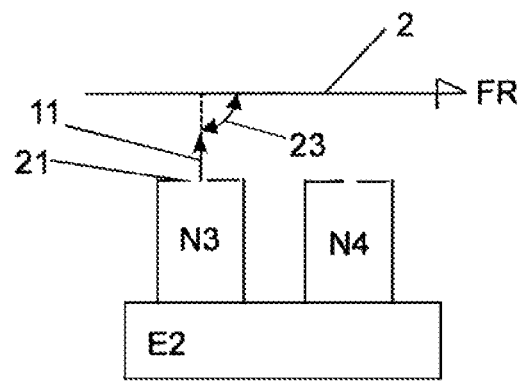
FIG. 3 is a schematic cross-sectional view of air blowing nozzles in the direction of arrows A2-A2 indicated in FIG. 2.

FIG. 3 is referred to. FIG. 3 is a diagram for explaining an air blowing angle 23 formed by the air blowing direction 11 of the airflow control apparatus and the film passing surface 2 and is a schematic cross-sectional view of the air blowing nozzles in the direction of arrows A2-A2 indicated in FIG. 2. In order to sufficiently suppress the MD flow and to ensure ability of heating, cooling, or drying the film, it is preferable that the air blowing angle 23 formed by the air blowing direction 11, which is the direction that the air blowing opening 17 blows the air, and the film passing surface 2 be perpendicular. The fact that the air blowing angle 23 is perpendicular means that the air blowing angle 23 that is formed by the air blowing direction 11 and the film passing surface 2 is within a range of 90±5°. Normally, due to an installation error of the air blowing nozzle or the like, the air blowing angle 23 may deviate somewhat from 90°. Thus, a preferable air blowing angle 23 is the range of 90±5°. It is more preferable that the air blowing angle 23 be in a range of 90±2°.

Although the air blowing angle 23 includes an angle on the downstream side of the film running direction and an angle on the upstream side of the film running direction, the air blowing angle 23 here is the angle on the downstream side of the film running direction.

The shape of the air blowing opening 17 of the air blowing nozzle is in a slit shape extending parallel to the film width direction, or a shape in which a plurality of holes are lined in the film width direction. The plurality of holes are not limited to perfect circles, and a plurality of openings blowing the air, which include ellipses and rectangles, only need to be arranged discretely in the film width direction. With this, the air curtain extending in the film width direction can be formed.

Figure 4:
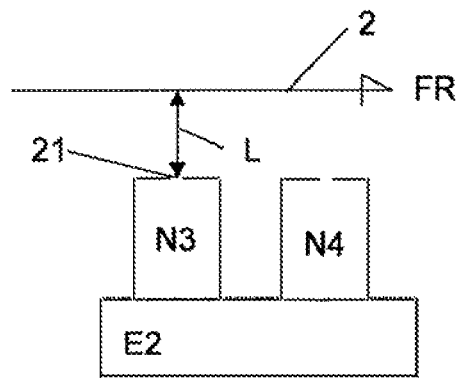
FIG. 4 is a schematic cross-sectional view of the air blowing nozzles in the direction of arrows A2-A2 indicated in FIG. 2.
Figure 5:
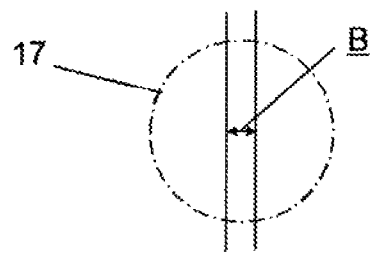
FIG. 5 is an enlarged view of a portion indicated with a reference symbol 17 in FIG. 2.

FIGS. 4 and 5 are referred to. FIG. 4 is a diagram for explaining a distance L between the air blowing opening on the air blowing surface 21 of the air blowing nozzle and the film passing surface and is a schematic cross-sectional view of the air blowing nozzles in the direction of arrows A2-A2 indicated in FIG. 2. FIG. 5 is a diagram for explaining a slit width B of the air blowing opening of the air blowing nozzle and is an enlarged view of a portion indicated with the reference sign 17 in FIG. 2. In the air blown from the air blowing nozzle, there are a potential core and a turbulent flow region. The potential core is an area that maintains an initial wind speed. The turbulent flow region is an external flow of the potential core and is an area where the flow velocity slows down as the surrounding static air is sucked in. As the air blown from the air blowing opening 17 on the air blowing surface 21 of the air blowing nozzle approaches the film passing surface 2, the wind speed of the air in the potential core becomes weaker and the turbulent region develops. Accordingly, as the distance L between the air blowing opening and the film passing surface becomes longer in FIG. 4, the straightness of the blowing air becomes weaker with respect to the disturbance such as the accompanying airflow, the stability is lost, and the airflow separation performance that blocks the MD flow deteriorates.

As a method of improving the airflow separation performance that blocks the MD flow, it is easily conceivable to increase the wind speed of blowing air. However, it is fundamentally difficult to develop a high blocking performance of MD flow even if the wind speed of the blowing air is increased while the distance L between the air blowing opening and the film passing surface is large. That is because the length or the strength of the potential core depends on the slit width B (see FIG. 5) in the running direction of film of the air blowing opening 17 on the air blowing surface 21, and it is not possible to ensure the stability of the blowing air by only increasing the wind speed. In addition, increasing the wind speed is not economical as the energy consumption (steam, electric power) of the airflow control apparatus increases.

Hence, in order to improve the airflow separation performance that blocks the MD flow, it is preferable that the distance L between the air blowing opening and the film passing surface and the slit width B satisfy the expression (L/B)≤11. It is more preferable that the distance L and the slit width B satisfy the expression (L/B)≤7. When the distance L is 100 mm, it is preferable that the slit width B be 10 mm or more, and in this case, the distance L and the slit width B satisfy the expression (L/B)≤10.

The lower limit of the value of (L/B) is not particularly limited. However, when the value of the slit width B is 10 mm, because the practical range of the distance L in consideration of the maintainability, workability, and the like becomes about 20 mm or more, it is preferable that the distance L and the slit width B satisfy the expression 2≤(L/B).

By satisfying the expression (L/B)≤11, the straightness or stability of the air blowing from the air blowing nozzle is further improved, thereby further improving the airflow separation performance that blocks the MD flow. Thus, it is possible to prevent the air of a different temperature from flowing into the tenter oven from the outside of the chamber of the tenter oven, to reduce unevenness of the film temperature, and to further reduce the amount of energy consumption needed for heating the circulating air to the set temperature of each processing chamber.

Even if the air blowing opening 17 is in a shape for which a plurality of holes are lined in the film width direction, the upper limit of the relation (L/R) between the distance L and a diameter R of the hole preferably satisfies (L/R)≤11, and more preferably satisfies (L/R)≤7, by the same reason as in the foregoing. It is preferable that the lower limit of the value of (L/B) satisfy 2≤(L/R). When the plurality of holes are not perfect circles but elliptical shapes or rectangular shapes, the diameter R of the hole can be calculated by an equivalent diameter R=4A/S from an area A and a perimeter length S of the hole.

As the distance L between the air blowing opening 17 and the film passing surface 2 is smaller, the airflow separation performance that blocks the MD flow is more improved as the potential core of the blowing air reaches the film passing surface 2 while maintaining the straightness and is stabilized against the disturbance such as accompanying airflow. Meanwhile, depending on the model and the condition of the manufacturing film, the slackness, soaring, and fluttering of the film may arise, and when the distance L between the air blowing opening 17 and the film passing surface 2 is too small, the film may come in contact with the air blowing nozzle, have scratches, and become a defect. Thus, it is preferable that the distance to avoid making contact with the film can be maintained, by raising and lowering the air blowing nozzle and adjusting the distance L. Examples of methods of raising and lowering include a method of attaching a jack to the air blowing nozzle.

The distance L between the air blowing opening 17 and the film passing surface 2 only needs to be selected in a range of 5 mm to 150 mm, and it is more preferable to be 10 mm to 90 mm. It is further preferable to be 20 mm to 50 mm.

Figure 6:
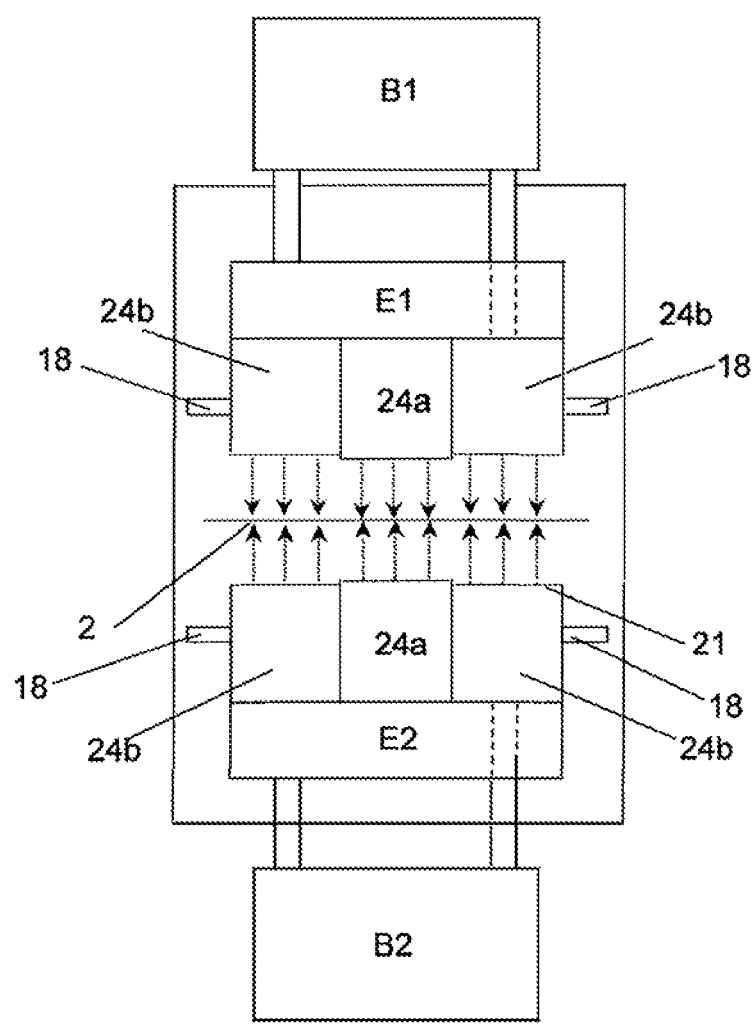
FIG. 6 is a schematic cross-sectional view in the direction of arrows A3-A3 indicated in FIG. 2.

FIG. 6 is a schematic cross-sectional view of the airflow control apparatus illustrated in FIG. 2 in the direction of arrows A3-A3 indicated in FIG. 2. In general, in order to change the width of the running film according to the film production model, the distance between rail covers R1 and R2 that cover clips grasping both ends of the film and clip rails in the tenter oven 3 is widened and narrowed in the width direction.

If it is not possible to make the distance from the air blowing surface 21 to the film passing surface 2 closer as the rail covers R1 and R2 interfere with the air blowing nozzle, the length in the width direction of the air blowing nozzle only needs to be made shorter than the distance between the rail covers R1 and R2 so that the air blowing nozzle is accommodated between the rail covers R1 and R2.

When the width of the running film is widened, by extending the length in the width direction of the air blowing nozzle while avoiding the contact or interference with the rail covers R1 and R2, the air curtain extending in the width direction of the running film can be formed.

The air blowing nozzles illustrated in FIG. 6 are one example of the air blowing nozzle capable of varying its length (expansion and contraction) in the width direction of the running film. Variable length air blowing nozzles N1, N2, N3, and N4 are made up of a fixed nozzle portion 24a, and a movable nozzle portion 24b that is in a fitting structure with respect to the fixed nozzle portion 24a and is capable of sliding in and out. The movable nozzle portion may be formed with movable portions of multiple stages.

In this case, the number of fixed nozzle portions and the number of movable nozzle portions forming the air blowing nozzle only need to be selected according to the changing width of the running film. By coupling the left and right movable nozzle portions 24b with the respective left and right rail covers R1 and R2 via rail connection mechanisms 18, it is possible to follow the changes in the width of the running film.

Figure 19:
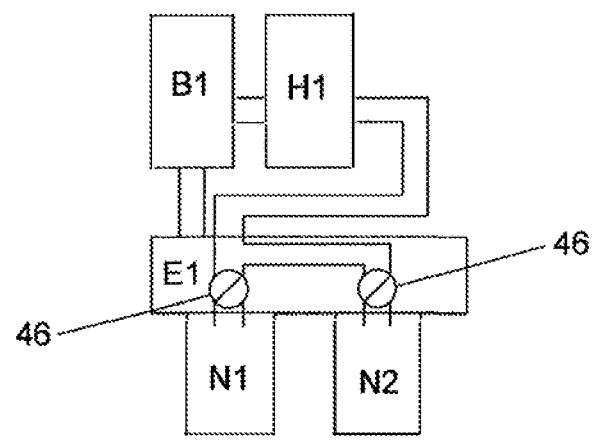
FIG. 19 is a schematic cross-sectional view illustrating air supply dampers 46 that adjust the amount of blowing air of blowing nozzles N1 and N2 illustrated in FIG. 1.
Figure 20:
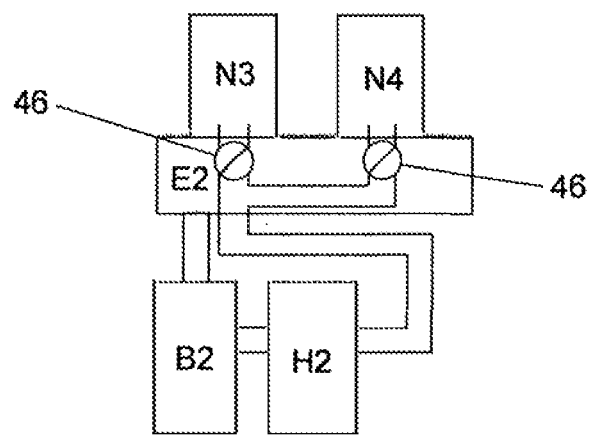
FIG. 20 is a schematic cross-sectional view illustrating the air supply dampers 46 that adjust the amount of blowing air of blowing nozzles N3 and N4 illustrated in FIG. 1.

FIGS. 19 and 20 are referred to. FIGS. 19 and 20 are schematic cross-sectional views for explaining mechanisms for adjusting the amount of blowing air of air blowing nozzles of the airflow control apparatus. FIG. 19 illustrates piping that couples a blower B1 and a heat exchange H1 with the air blowing nozzles N1 and N2 in FIG. 1, and the air supply dampers 46. FIG. 20 illustrates piping that couples a blower B2 and a heat exchange H2 with the air blowing nozzles N3 and N4 in FIG. 1, and the air supply dampers 46. By installing the air supply dampers 46 to the respective air supply piping and changing the opening degree of the air supply damper 46, it is possible to adjust the amount of blowing air individually. The means to adjust the amount of air supply may be a valve, an orifice, and the like. By individually adjusting the amount of blowing air of the air blowing nozzles N1, N2, N3, and N4, it is possible to reduce the amount of energy consumption needed for heating the blowing air and to contribute to energy saving.

Figure 21:
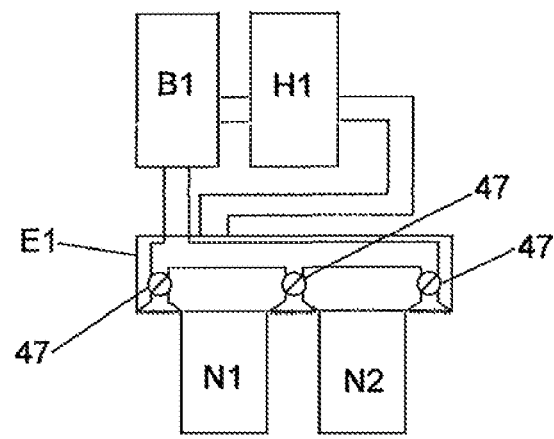
FIG. 21 is a schematic cross-sectional view illustrating exhaust dampers 47 that adjust the exhaust air volume of an exhaust plenum E1 illustrated in FIG. 1.
Figure 22:
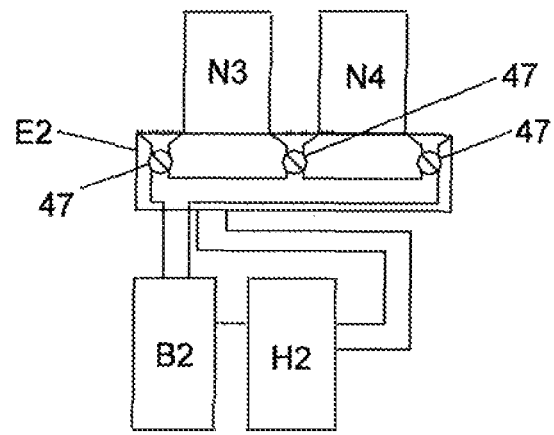
FIG. 22 is a schematic cross-sectional view illustrating the exhaust dampers 47 that adjust the exhaust air volume of an exhaust plenum E2 illustrated in FIG. 1.

FIGS. 21 and 22 are referred to. FIGS. 21 and 22 are schematic cross-sectional views for explaining mechanisms for adjusting the exhaust air volume of exhaust mechanisms of the airflow control apparatus. FIG. 21 illustrates piping that couples the blower B1 and an exhaust plenum E1 in FIG. 1, and exhaust dampers 47. FIG. 22 illustrates piping that couples the blower B2 and an exhaust plenum E2 in FIG. 1, and the exhaust dampers 47. By installing the exhaust dampers 47 to the respective exhaust piping and changing the opening degree of the exhaust damper 47, it is possible to adjust the exhaust air volume individually. The means to adjust the exhaust air volume may be a valve, an orifice, and the like. By individually adjusting the exhaust air volume sucking from the exhaust mechanisms 8a, 8b, 8c, and 8d, it is possible to reduce heat loss and to contribute to energy saving.

The present invention is an apparatus for separating the entrance and/or the exit of the tenter oven from the airflow of the outside of the tenter oven chamber and controlling the airflow. Thus, when the airflow control apparatus is installed adjacent to the upstream side in the film conveying direction of the entrance of the tenter oven, it is preferable that the air temperature of air blown from the air blowing nozzle be higher than the air temperature of the outside of the tenter oven chamber at the entrance of the tenter oven. This prevents the film from being excessively cooled and prevents a defect from occurring in a preheating process in the tenter oven. When the airflow control apparatus is installed adjacent to the downstream side in the film conveying direction of the exit of the tenter oven, it is preferable that the temperature of air blown from the air blowing nozzle be higher than the air temperature of the outside of the tenter oven chamber at the exit of the tenter oven. This prevents the film from being excessively cooled and prevents a defect from occurring in a downstream process of the tenter oven. Furthermore, it is preferable that the temperature of the air blown from the air blowing nozzle be not higher than a glass transition temperature of the film. With this, changing the crystal structure of the thermoplastic resin film is avoided.

Films to which the airflow control apparatus of the present invention can be applied are not particularly limited, and it can be applied to a known thermoplastic resin film that is heated and stretched in the tenter oven.

Next, the present invention will be further described with reference to examples.

EXAMPLES

Example 1

First, a method of evaluating effects according to the present invention will be described. A model test machine that modeled the airflow control apparatus of the present invention and a chamber that constitutes a tenter oven body was made, and the MD flow blocking performance was measured by using this.

Figure 7:
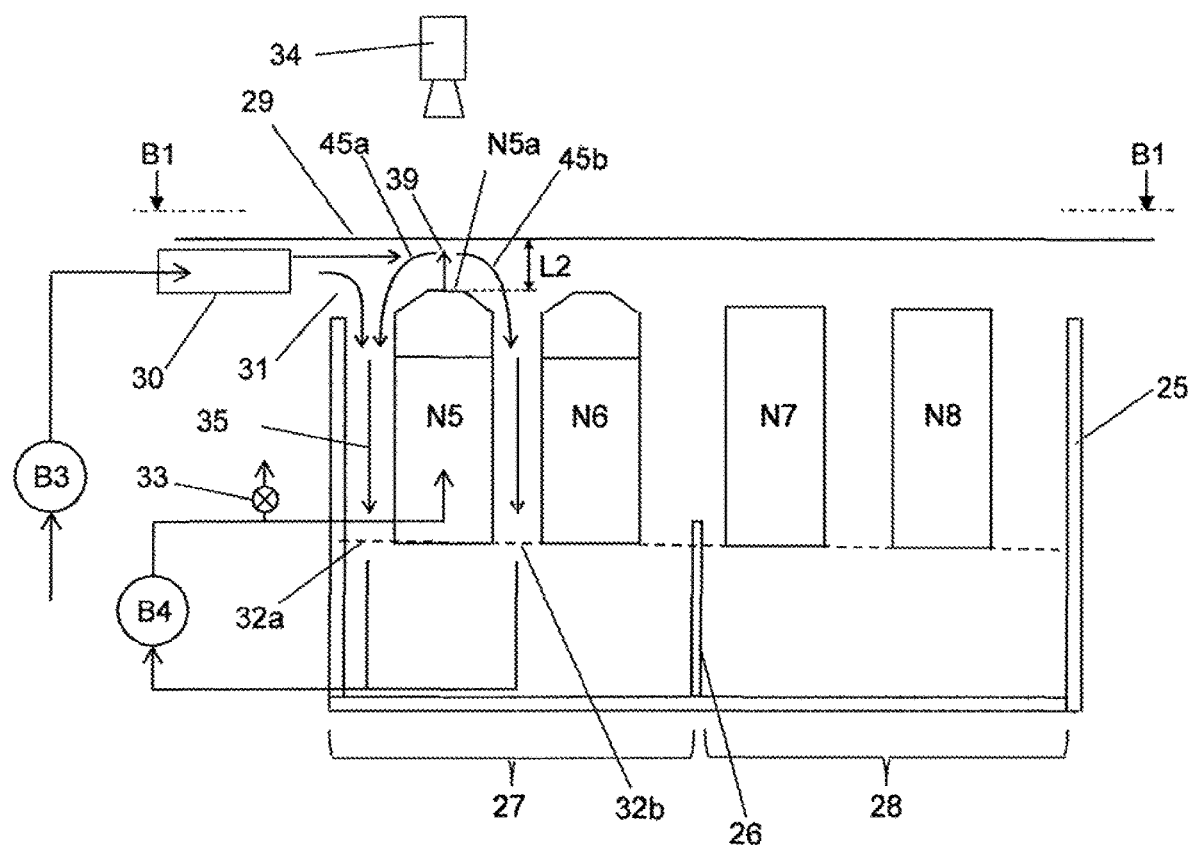
FIG. 7 is a schematic cross-sectional view of a model test machine that modeled a chamber constituting the airflow control apparatus of the present invention and is a diagram illustrating the flow of air in Example 1 to Example 3.

FIG. 7 is a schematic cross-sectional view of this model test machine. In order to conduct the test simply and inexpensively, as a substitute for a thermoplastic resin film, a transparent acrylic plate 29 having a length of 2.0 m in the running direction of the film and a width of 1.8 m in the width direction of the running film was fixed at the position of the film passing surface.

The inner dimensions of the chamber of the model test machine were set to 1.8 m in length in the film running direction, 1.8 m in width in the film width direction, and 1.5 m in height. On the outer wall on the left-hand side of the model test machine in FIG. 7, an entrance 31 of the model test machine which is equivalent to the entrance of the airflow control apparatus was provided. On the lower side of the acrylic plate 29, N5, N6, N7, and N8 as air blowing nozzles were installed at intervals of 0.3 m pitch in the film running direction. The shape of the air blowing opening on an air blowing surface N5a of the air blowing nozzle N5 was set to a slit shape having a width of 0.008 m in the film running direction.

The air blowing surface N5a was arranged so as to be parallel to the lower surface of the acrylic plate 29. On the model test machine, a mechanism that adjusts a distance L2 that is from the air blowing surface to the lower surface of the acrylic plate 29 was provided. A blower B4 was provided to supply air to the air blowing nozzle N5, and the blower B4 and the air blowing nozzle N5 were connected by a duct. The amount of air blowing was adjusted by the opening degree of a damper 33 while controlling the rotation speed of the blower B4 with an inverter. No heat exchanger was installed between the blower B4 and the air blowing nozzle N5, and the temperature of the air blown out from the air blowing nozzle N5 was set at a room temperature. The air blowing angle 23 (see FIG. 3) of the air blowing nozzle N5 was arranged so as to be 90±5°.

The wind speed of blowing air at the air blowing opening on the air blowing surface N5a was measured by using a Pitot tube anemometer. Because the wind speed fluctuates with time, by setting a sampling period to one second, an average value that is obtained when measured for 10 seconds in succession was assumed as the air blowing wind speed. By multiplying the measured wind speed of blowing air by the area of the air blowing opening, the air volume of blowing air of the air blowing nozzle N5 was calculated.

The blown air hits the acrylic plate 29, changes the direction of flow, turns into return air 35, is sucked into exhaust mechanisms 32a and 32b, and is supplied to the air blowing nozzle N5 again via the blower B4.

The exhaust air volume in the exhaust mechanism 32a was calculated by multiplying the wind speed of the return air 35 by the suction area of the exhaust mechanism 32a. The wind speed of the return air 35 was measured by using a Pitot tube anemometer. Because the wind speed of the return air 35 fluctuates with time, by setting the sampling period to one second, an average value that is obtained when measured for 10 seconds in succession was assumed as the wind speed of return air. The same applies to the calculation method of the exhaust air volume of the exhaust mechanism 32b.

In order to generate the MD flow simulatively, an MD flow generator 30 and a blower B3 were provided. The blower B3 and the MD flow generator 30 were connected by a duct, and the air was supplied from the blower B3 to the MD flow generator 30. By controlling the rotation speed of the blower B3 with an inverter, the air supply flow rate of the MD flow generator 30 was adjusted. The wind speed of the simulatively generated MD flow was measured by using a Pitot tube anemometer at the entrance 31 of the model test machine. Because the wind speed fluctuates with time, by setting the sampling period to one second, an average value that is obtained when measured for 10 seconds in succession was assumed as the wind speed of the MD flow.

Figure 8:
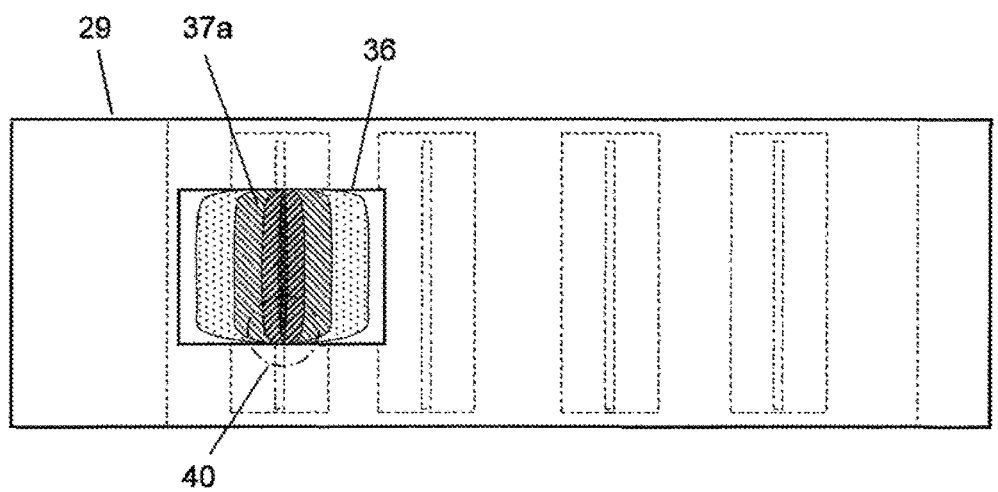
FIG. 8 is a schematic plan view in the direction of arrows B1-B1 indicated in FIG. 7.
Figure 9:
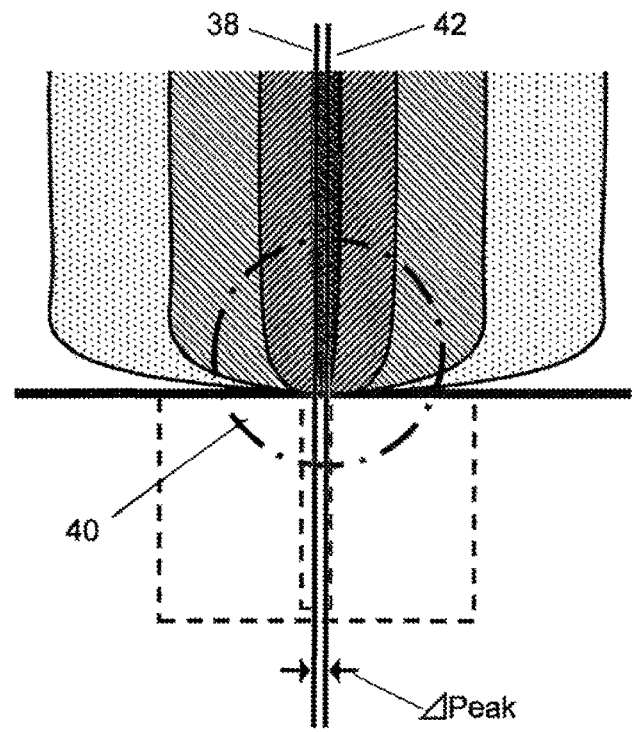
FIG. 9 is an enlarged view of a portion indicated with a reference symbol 40 in FIG. 8.

With reference to FIGS. 8 and 9, a method of evaluating airflow control performance will be described. FIG. 8 is a diagram explaining a method of measuring a state in which the MD flow simulatively generated in the model test machine is separated by the air blowing nozzle and is a schematic plan view in the direction of arrows B1-B1 indicated in FIG. 7. FIG. 9 is a diagram explaining a peak position deviation ΔPeak of temperature distribution on a rubber heater that resulted when the MD flow was separated by the air blowing nozzle and is an enlarged view of a portion indicated with the reference sign 40 in FIG. 8. At a position that is immediately above the place where the air blowing nozzle N5 of the model test machine is located and is in the central portion in the width direction of the acrylic plate 29, an opening having a width of 150 mm and a length of 150 mm was provided on the acrylic plate 29. In this opening, a sheet-like rubber heater 36 having a width of 150 mm and a length of 150 mm was installed. The position of the lower surface of the rubber heater 36 was aligned to the position of the lower surface of the acrylic plate 29. In addition, in order to make it possible to photograph the temperature distribution on the surface of the rubber heater, a thermal imaging device 34 was installed at a position 0.7 m away from and above the upper surface of the acrylic plate 29, and the measuring visual field of the thermal imaging device 34 was adjusted.

While heating the rubber heater 36 to 100° C. and blowing the air of the room temperature from the air blowing nozzle N5 toward the rubber heater 36, the MD flow was simulatively generated by the MD flow generator 30. The temperature distribution of the surface of the rubber heater 36 was measured by the thermal imaging device 34 and the obtained thermal image was analyzed by dedicated analysis software, thereby calculating a peak position 42 of the temperature distribution on the rubber heater, and the peak position deviation ΔPeak from a central axis 38 of the air blowing opening of the air blowing nozzle N5.

FIG. 7 is referred to again. When the MD flow simulatively generated by the MD flow generator 30 is separated by the air blown from the air blowing nozzle N5, an upstream direction airflow 45a and a downstream direction airflow 45b are generated at the separated position. On the surface of the rubber heater 36, because the temperature gradient corresponding to the airflow direction is formed, the temperature distribution for which a peak is at the position where the airflow is separated will result. Accordingly, by measuring the temperature distribution of the surface of the rubber heater 36 with the thermal imaging device 34 and checking the presence of the peak of the temperature distribution lying in the width direction of the air blowing nozzle, it can be determined whether the simulatively generated MD flow is separated.

It can be determined that the simulatively generated MD flow was more effectively separated as the value of the peak position deviation ΔPeak from the central axis 38 of the air blowing opening of the air blowing nozzle N5 is closer to 0 mm.

By using the above-described model test machine, the peak position deviation ΔPeak [mm] was obtained when it was taken that the flow velocity of the MD flow is 5.0 m/s, the wind speed of the blowing air is 10.0 m/s, the distance L2 from the air blowing surface to the lower surface of the heater is 30 mm (L2/B=3.8), the exhaust air volume from the exhaust mechanism of the upstream side is 16.0 m$^3$/min, and the exhaust air volume from the exhaust mechanism of the downstream side is 16.0 m$^3$/min.

Example 2

The test was conducted under the same apparatus configuration and the same conditions as those of Example 1 except that the distance L2 was set to 50 mm (L2/B=6.3), and the peak position deviation ΔPeak [mm] was obtained.

Example 3

The test was conducted under the same apparatus configuration and the same conditions as those of Example 1 except that the distance L2 was set to 70 mm (L2/B=8.8), and the peak position deviation ΔPeak [mm] was obtained.

Example 4

The test was conducted under the same apparatus configuration and the same conditions as those of Example 1 except that the distance L2 was set to 90 mm (L2/B=11.3), and the peak position deviation ΔPeak [mm] was obtained.

Comparative Example 1

The test was conducted under the same apparatus configuration and the same conditions as those of Example 4 except that the exhaust from the exhaust mechanism on the downstream side was stopped, and the peak position deviation ΔPeak [mm] was obtained.

Comparative Example 2

The test was conducted under the same apparatus configuration and the same conditions as those of Example 2 except that the blowing of air from the air blowing nozzle N5 was stopped, and the peak position deviation ΔPeak [mm] was obtained.

Comparative Example 3

The test was conducted under the same apparatus configuration and the same conditions as those of Example 2 except that the exhaust from the exhaust mechanism on the upstream side was stopped, and the peak position deviation ΔPeak [mm] was obtained.

Summary of Results

The test conditions and the test results of the respective examples and the comparative examples are summarized in Table 1 and Table 2.

TABLE 1

| | Wind speed of MD flow [m/s] | Wind speed of blowing air [m/s] | Distance L2 [m/m] | Slit width B [m/m] | L2/B [—] |
|---|---|---|---|---|---|
| Example 1 | 5.0 | 10.0 | 30 | 8.0 | 3.8 |
| Example 2 | 5.0 | 10.0 | 50 | 8.0 | 6.3 |
| Example 3 | 5.0 | 10.0 | 70 | 8.0 | 8.8 |
| Example 4 | 5.0 | 10.0 | 90 | 8.0 | 11.3 |
| Comparative example 1 | 5.0 | 10.0 | 90 | 8.0 | 11.3 |
| Comparative example 2 | 5.0 | 0 | 50 | 8.0 | 6.3 |
| Comparative example 3 | 5.0 | 10.0 | 50 | 8.0 | 6.3 |

TABLE 2

| | Air volume of blowing air of air blowing nozzle N5 [m$^3$/min] | Exhaust mechanism Upstream side exhaust air volume [m$^3$/min] | Exhaust mechanism Downstream side exhaust air volume [m$^3$/min] | Peak position deviation ΔPeak [mm] |
|---|---|---|---|---|
| Example 1 | 4.2 | 16.0 | 16.0 | 0 |
| Example 2 | 4.2 | 16.0 | 16.0 | 6.5 |
| Example 3 | 4.2 | 16.0 | 16.0 | 15.3 |
| Example 4 | 4.2 | 16.0 | 16.0 | 24.0 |
| Comparative example 1 | 4.2 | 16.0 | 0 | Peak not confirmed |
| Comparative example 2 | 0 | 16.0 | 16.0 | Peak not confirmed |
| Comparative example 3 | 4.2 | 0 | 16.0 | Peak not confirmed |

From the results of the examples and the comparative examples, by blowing the air from the air blowing nozzle toward the film surface, and at the same time, by exhausting the return air by the exhaust mechanisms provided on the upstream side and the downstream side of the film running direction than the air blowing nozzle, it can be found that it is possible to separate the flow of airflow and to block the MD flow.

From the results of Example 1 to Example 4, it can be found that, as the value of L2/B is made smaller by shortening the distance from the air blowing surface to the lower surface of the heater, the value of the peak position deviation ΔPeak [mm] becomes smaller, and that the flow of airflow was effectively separated.

Figure 10:
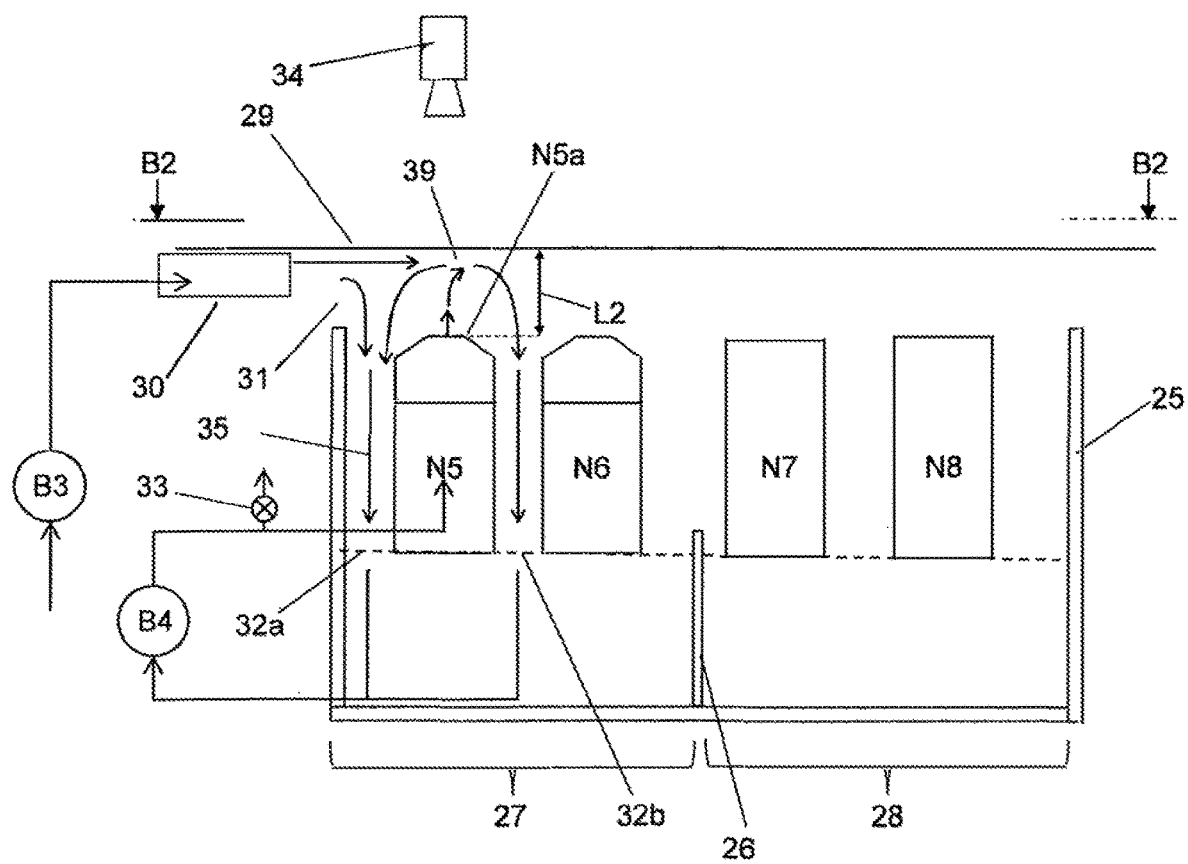
FIG. 10 is a schematic cross-sectional view of the model test machine and is a diagram illustrating the flow of air in Example 4.
Figure 11:
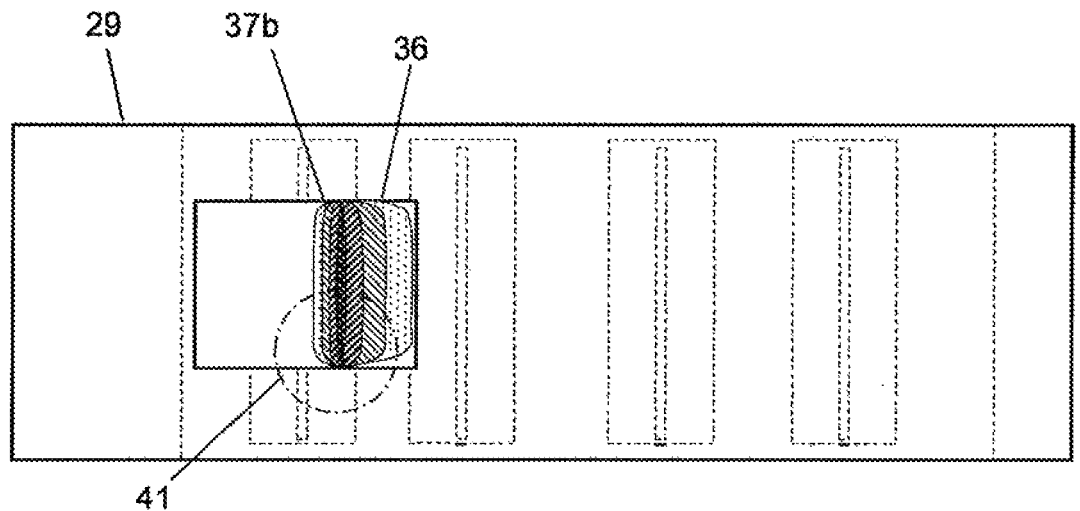
FIG. 11 is a schematic plan view in the direction of arrows B2-B2 indicated in FIG. 10.
Figure 12:
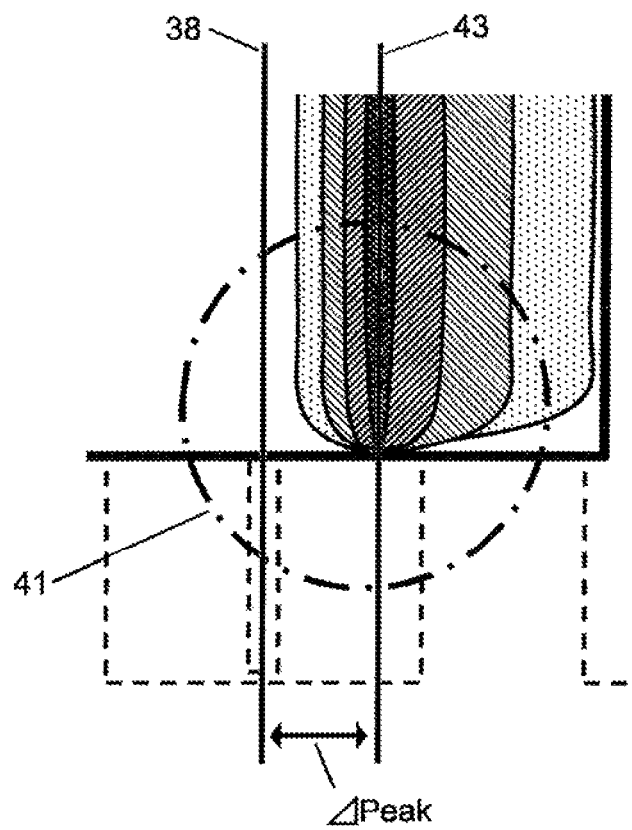
FIG. 12 is an enlarged view of a portion indicated with a reference symbol 41 in FIG. 11.

The result of Example 4 will be described in more detail with reference to FIGS. 10, 11, and 12. FIG. 10 is a diagram illustrating the flow of air in Example 4, and FIGS. 11 and 12 are diagrams illustrating the evaluation result of the airflow separation performance of Example 4. In Example 4, because the condition was that the value of L2/B becomes larger than 11, the ability of separating the airflow was slightly low and air 39 blown from the air blowing nozzle N5 was driven away toward the downstream side by the MD flow simulatively generated by the MD flow generator 30. Accordingly, as with a schematic diagram 37b of the temperature distribution measured by the thermal imaging device 34, the peak position of the temperature distribution was deviated toward the downstream side. However, although the peak position of the temperature distribution was deviated toward the downstream side, the MD flow was separated, changed the direction of the flow, and was sucked into the exhaust mechanisms 32a and 32b together with the return air 35 of the air blowing nozzle N5.

Figure 13:
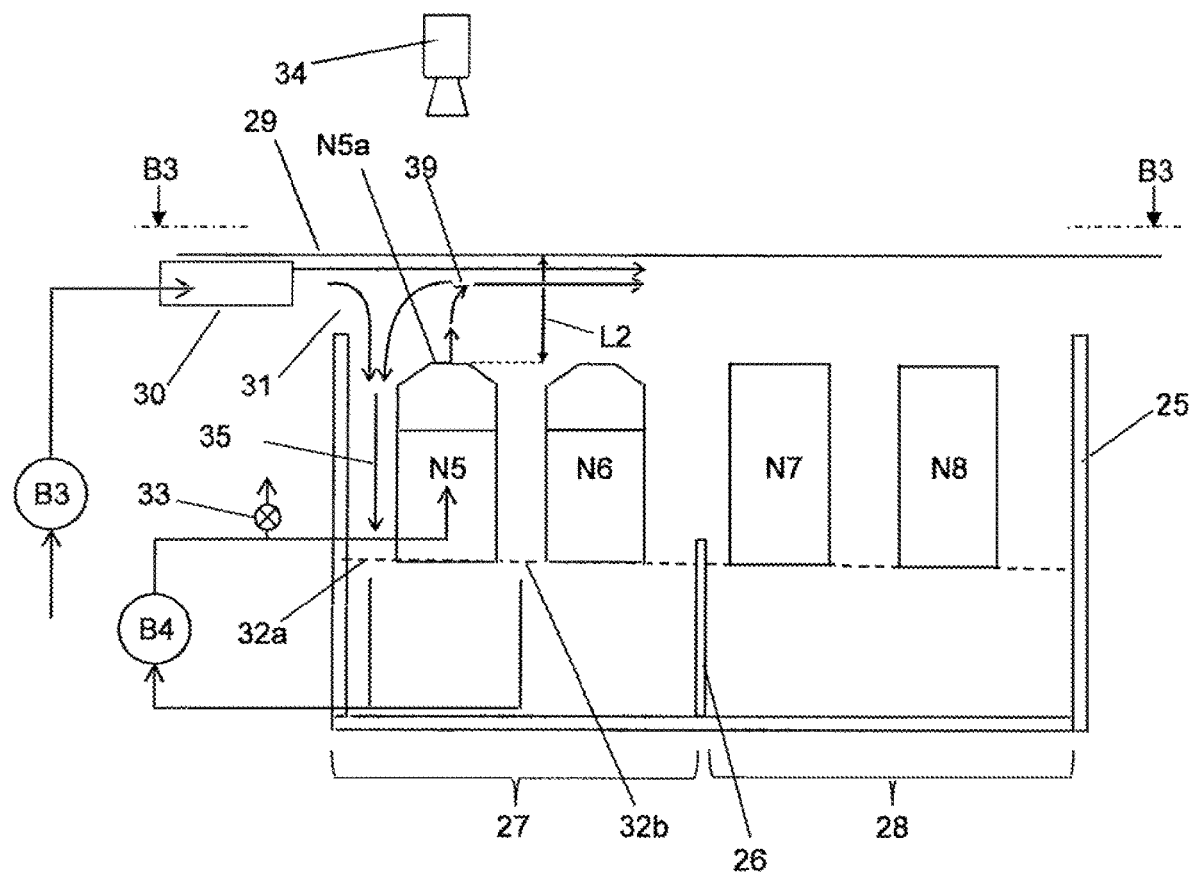
FIG. 13 is a schematic cross-sectional view of the model test machine and is a diagram illustrating the flow of air in Comparative Example 1.
Figure 14:
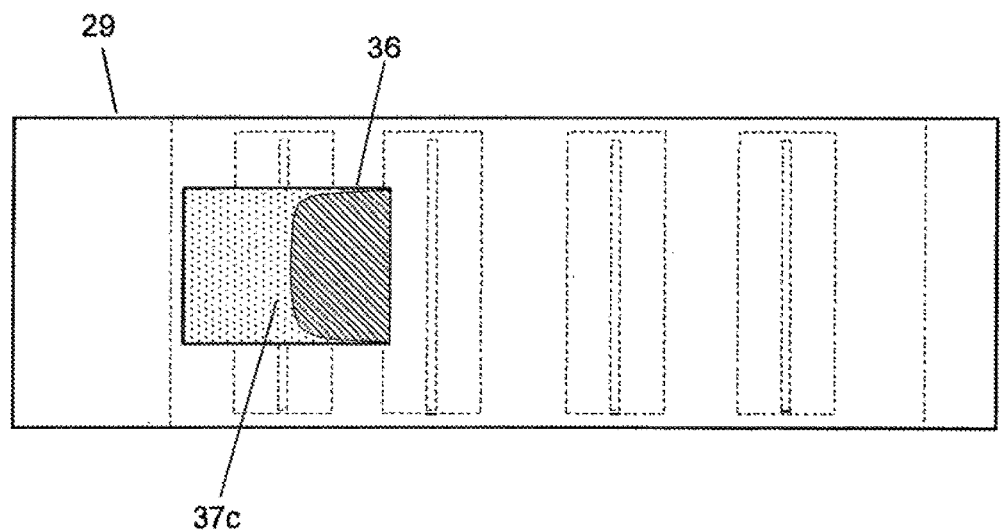
FIG. 14 is a schematic plan view in the direction of arrows B3-B3 indicated in FIG. 13.

The result of Comparative Example 1 will be described in more detail with reference to FIGS. 13 and 14. FIG. 13 is a diagram illustrating the flow of air in Comparative Example 1, and FIG. 14 is a diagram illustrating the evaluation result of the airflow separation performance of Comparative Example 1. In Comparative Example 1, although the air is sucked in the exhaust mechanism 32a located on the upstream side than the air blowing nozzle N5, because the air is not sucked in the exhaust mechanism 32b of the downstream side, the air balance was lost. Thus, the blowing air 39 of the air blowing nozzle N5 was heavily driven away toward the downstream side by the MD flow simulatively generated by the MD flow generator 30. As a result, as with a schematic diagram 37c of the temperature distribution measured by the thermal imaging device 34, it was not possible to confirm the peak position of the temperature distribution.

Figure 15:
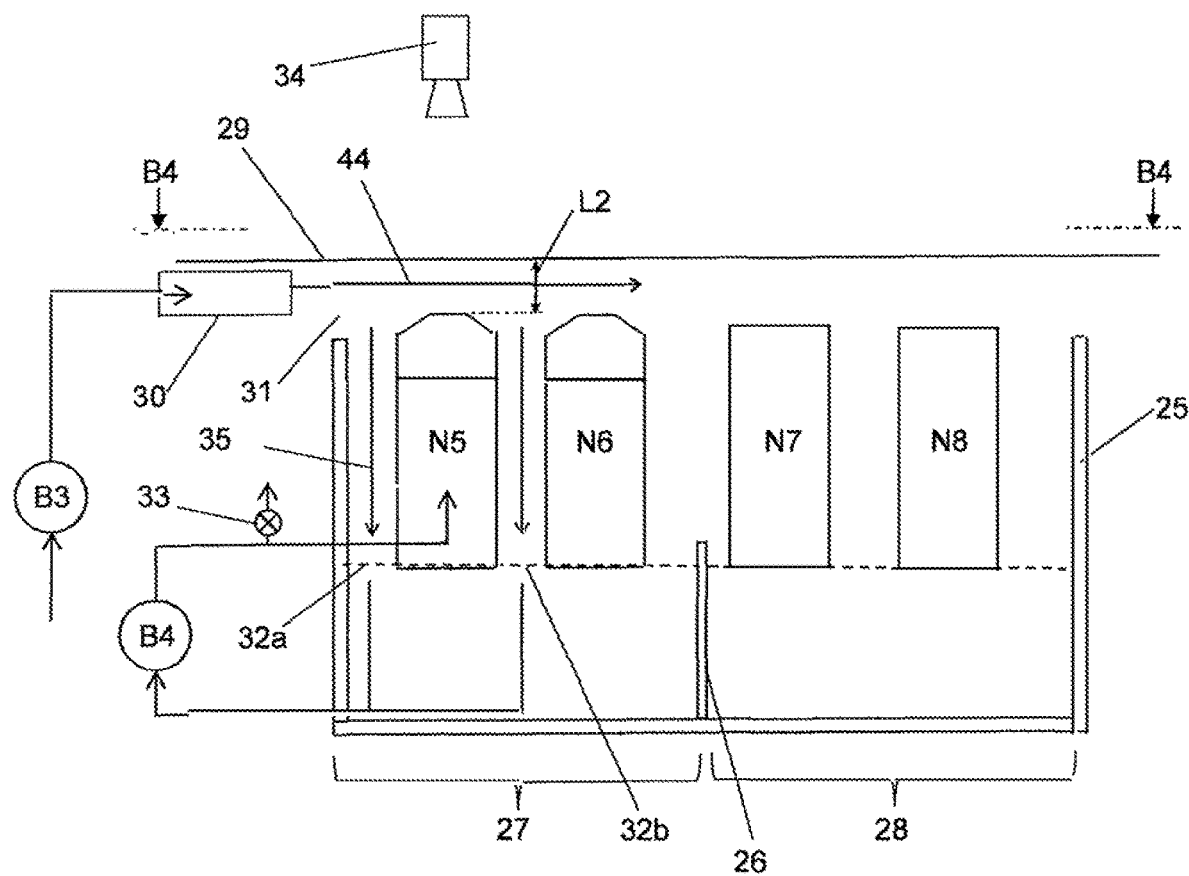
FIG. 15 is a schematic cross-sectional view of the model test machine and is a diagram illustrating the flow of air in Comparative Example 2.
Figure 16:
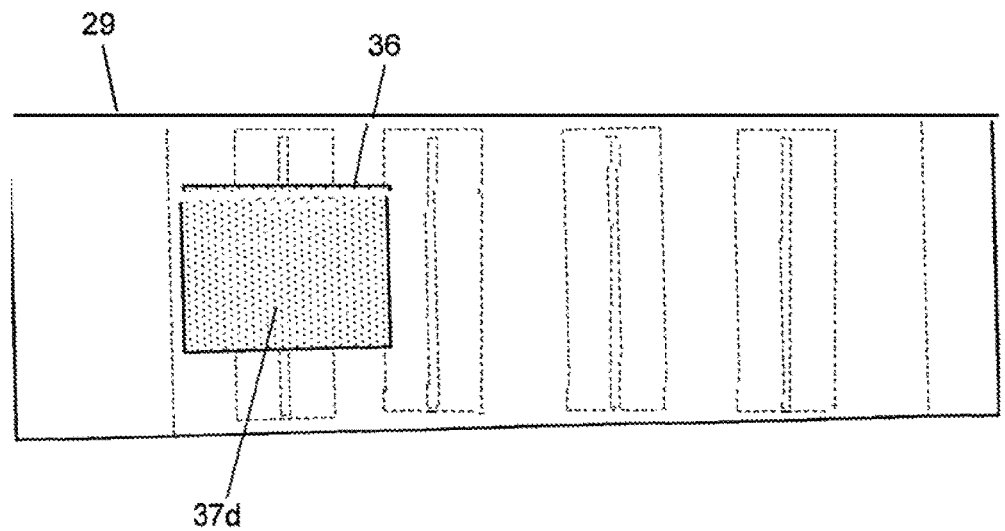
FIG. 16 is a schematic plan view in the direction of arrows B4-B4 indicated in FIG. 15.

The result of Comparative Example 2 will be described in more detail with reference to FIGS. 15 and 16. FIG. 15 is a diagram illustrating the flow of air in Comparative Example 2, and FIG. 16 is a diagram illustrating the evaluation result of the airflow separation performance of Comparative Example 2. In Comparative Example 2, because no air was blown from the air blowing nozzle N5, the MD flow simulatively generated by the MD flow generator 30 blows, as indicated by an airflow 44, toward the downstream side without being separated along the way. Thus, as with a schematic diagram 37d of the temperature distribution measured by the thermal imaging device 34, it was not possible to confirm the peak position of the temperature distribution.

Figure 17:
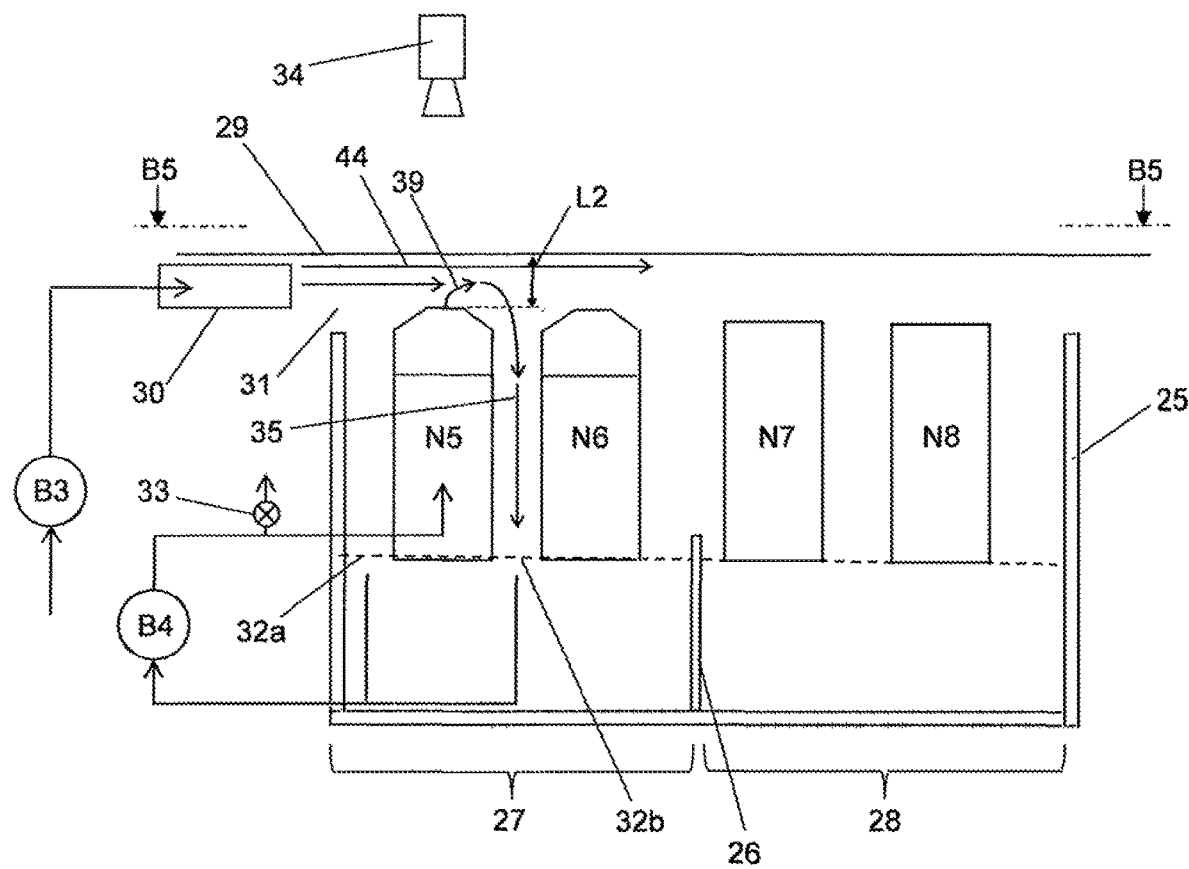
FIG. 17 is a schematic cross-sectional view of the model test machine and is a diagram illustrating the flow of air in Comparative Example 3.
Figure 18:
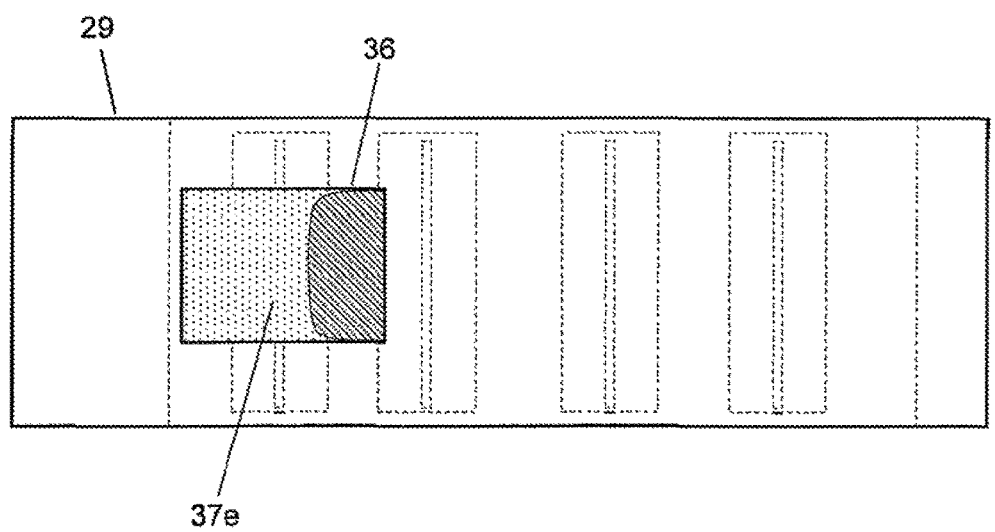
FIG. 18 is a schematic plan view in the direction of arrows B5-B5 indicated in FIG. 17.

The result of Comparative Example 3 will be described in more detail with reference to FIGS. 17 and 18. FIG. 17 is a diagram illustrating the flow of air in Comparative Example 3, and FIG. 18 is a diagram illustrating the evaluation result of the airflow separation performance of Comparative Example 3. In Comparative Example 3, although the air is sucked in the exhaust mechanism 32b located on the downstream side than the air blowing nozzle N5, because the air is not sucked in the exhaust mechanism 32a of the upstream side, the air balance was lost. Thus, the blowing air 39 of the air blowing nozzle N5 was heavily driven away toward the downstream side by the MD flow simulatively generated by the MD flow generator 30. As a result, as with a schematic diagram 37e of the temperature distribution measured by the thermal imaging device 34, it was not possible to confirm the peak position of the temperature distribution.

INDUSTRIAL APPLICABILITY

The airflow control apparatus of the present invention is preferably applicable to a heating and stretching process in a tenter oven of film manufacturing facilities, but the applicable range is not limited thereto.

REFERENCE SIGNS LIST

1 AIRFLOW CONTROL APPARATUS
2 FILM PASSING SURFACE
3 TENTER OVEN
4 TENTER OVEN ENTRANCE
5 TENTER OVEN EXIT
6 BOX-SHAPED BODY
8a, 8b, 8c, 8d EXHAUST MECHANISM
9 ENTRANCE OF AIRFLOW CONTROL APPARATUS
10 INFLOW AIR FROM OUTSIDE OF APPARATUS
11, 15 AIR BLOWING DIRECTION
12, 16 RETURN AIR
13 EXIT OF AIRFLOW CONTROL APPARATUS
14 INFLOW AIR FROM TENTER OVEN
17 AIR BLOWING OPENING (SLIT OR HOLES)
18 RAIL CONNECTION MECHANISM
21 AIR BLOWING SURFACE
23 AIR BLOWING ANGLE
24a FIXED NOZZLE
24b MOVABLE NOZZLE
25 OUTER WALL OF MODEL TEST MACHINE
26 PARTITION BOARD
27 AIRFLOW CONTROL APPARATUS EVALUATION PORTION
28 OVEN BODY EVALUATION PORTION
29 ACRYLIC PLATE
30 MD FLOW GENERATOR
31 ENTRANCE OF MODEL TEST MACHINE
32a, 32b EXHAUST MECHANISM
33 DAMPER
34 THERMAL IMAGING DEVICE
35 RETURN AIR
36 RUBBER HEATER
37a, 37b, 37c, 37d, 37e SCHEMATIC DIAGRAM OF TEMPERATURE DISTRIBUTION MEASURED BY THERMAL IMAGING DEVICE
38 CENTRAL AXIS OF AIR BLOWING OPENING
39 BLOWING AIR OF AIR BLOWING NOZZLE N5
40, 41 ENLARGED POSITION OF TEMPERATURE DISTRIBUTION ON RUBBER HEATER
42, 43 PEAK POSITION OF TEMPERATURE DISTRIBUTION ON RUBBER HEATER
44 AIRFLOW BY MD FLOW
45a UPSTREAM DIRECTION AIRFLOW
45b DOWNSTREAM DIRECTION AIRFLOW
46 AIR SUPPLY DAMPER

47 EXHAUST DAMPER
FR FILM RUNNING DIRECTION
N1, N2, N3, N4, N5, N6, N7, N8 AIR BLOWING NOZZLE
N5a AIR BLOWING SURFACE
E1, E2 EXHAUST PLENUM
B1, B2, B3, B4 BLOWER
H1, H2 HEAT EXCHANGER
R1, R2 RAIL COVER
L DISTANCE BETWEEN AIR BLOWING OPENING AND FILM PASSING SURFACE
L2 DISTANCE FROM AIR BLOWING SURFACE TO LOWER SURFACE OF HEATER
B SLIT WIDTH
ΔPeak DEVIATION OF PEAK POSITION

The invention claimed is:

1. An airflow control apparatus for a tenter oven including an entrance into which a film is conveyed and an exit from which the film is taken out, the airflow control apparatus installed adjacent to at least one of an upstream side in a film running direction of the tenter oven entrance and a downstream side in the film running direction of the tenter oven exit, the airflow control apparatus being located outside of the tenter oven and comprising therein:

at least one pair of air blowing nozzles that are air blowing nozzles configured to blow air toward the film, the air blowing nozzles of each pair facing each other across a film passing surface;

at least one pair of upstream-side exhaust mechanisms that are exhaust mechanisms configured to suck in air in the airflow control apparatus, the upstream-side exhaust mechanisms being located on the upstream side of a respective one of the at least one pair of air blowing nozzles in the film running direction, and each pair of the upstream-side exhaust mechanisms facing each other across the film passing surface; and at least one pair of downstream-side exhaust mechanisms that are exhaust mechanisms configured to suck in the air in the airflow control apparatus, the downstream-side exhaust mechanisms being located on the downstream side of a respective one of the at least one pair of air blowing nozzles in the film running direction, and each pair of the downstream-side exhaust mechanisms facing each other across the film passing surface.

2. The airflow control apparatus according to claim 1, wherein a plurality of pairs of the air blowing nozzles are provided.

3. The airflow control apparatus according to claim 1, wherein a plurality of pairs of at least one of the upstream-side exhaust mechanisms and the downstream-side exhaust mechanisms are provided.

4. The airflow control apparatus according to claim 1, wherein a shape of an air blowing opening of each of the air blowing nozzles is in a slit shape extending parallel to a film width direction, and an angle that is formed by an air blowing direction of the air blowing opening and the film passing surface is in a range of 85° to 95°.

5. The airflow control apparatus according to claim 4, wherein a distance L between the air blowing opening and the film passing surface and a length B in the film running direction of a slit of the air blowing opening satisfy L/B≤11.

6. The airflow control apparatus according to claim 1, wherein each of the air blowing nozzles is formed by a plurality of housings such that at least one of the housings fits at least partially within another one of the housings in a film width direction and each of the air blowing nozzles includes a mechanism that expands and contracts in the film width direction.

7. A method for manufacturing a stretched film, the method comprising:

running a film to a tenter oven and to the airflow control apparatus according to claim 1 installed adjacent to at least one of the upstream side in the film running direction of the entrance of the tenter oven and the downstream side in the film running direction of the exit of the tenter oven, wherein the airflow control apparatus is located outside of the tenter oven;

sucking in air in the airflow control apparatus by the upstream-side exhaust mechanisms and the downstream-side exhaust mechanisms while blowing air toward the film from the air blowing nozzles, in the airflow control apparatus; and stretching the film while heating the film, in the tenter oven.

8. The method for manufacturing a stretched film according to claim 7, wherein the airflow control apparatus is installed adjacent to the upstream side in the film running direction of the entrance of the tenter oven, and temperature of air blown from the air blowing nozzles is not lower than temperature of air outside of a tenter oven chamber at the entrance of the tenter oven but not higher than a glass transition temperature of the film.

9. The method for manufacturing a stretched film according to claim 7, wherein the airflow control apparatus is installed adjacent to the downstream side in the film running direction of the exit of the tenter oven, and temperature of air blown from the air blowing nozzles is not lower than temperature of air outside of a tenter oven chamber at the exit of the tenter oven but not higher than a glass transition temperature of the film.

\* \* \* \* \*